Nov. 22, 1955 M. A. LERMAN 2,724,285
APPARATUS FOR OPERATING PEDAL CONTROLS OF AN AUTOMOBILE
Filed Dec. 17, 1953

INVENTOR
MONROE ARNOLD LERMAN
BY *Samuel J Stree*
HIS ATTORNEY.

United States Patent Office 2,724,285
Patented Nov. 22, 1955

2,724,285

APPARATUS FOR OPERATING PEDAL CONTROLS OF AN AUTOMOBILE

Monroe Arnold Lerman, Sunnyside, N. Y.

Application December 17, 1953, Serial No. 398,782

1 Claim. (Cl. 74—481)

The present invention relates to a new and improved apparatus for operating controls of an automobile. This application is a continuation in part of my copending patent application Serial No. 238,660 filed on July 26, 1951.

The invention is directed to solving the difficulties faced by physically handicapped persons in operating conventional automobiles, particularly when those persons lack full use of their legs. In conventional automobiles, it is usual to include clutch, brake, and accelerator pedals which are necessarily foot operated. Handicapped persons who have available use of only their arms cannot operate such foot controls. It has in the past been necessary to provide such handicapped persons with special hand-operated controls. Such specially designed and built automobiles are not generally available. Their production is limited also to certain few makes and models and their cost is often prohibitively high. The present invention is directed to avoiding the necessity of providing specially built automobiles for handicapped drivers. The novel apparatus embodying the invention is adapted for installation in any automobile having foot pedals so that the pedals can be operated solely by use of one hand or arm of the driver. In addition the apparatus is so arranged that the foot pedals remain fully operable in the normal way by a driver having use of his legs. Thus the physically handicapped driver can leave the automobile in the care of garage attendants who will drive the automobile in the usual way. Also the handicapped driver can alternate in the use of the automobile with any other driver who will operate the controls by foot or hand at his option. In some cases the physically handicapped driver has full use of his arms and one leg. The apparatus of the present invention is so arranged that this driver can operate the pedal or pedals disposed for operation by that leg and the remaining pedal or pedals can be operated by hand. In automobiles including conventional automatic shift mechanisms, the clutch pedal is usually omitted. The apparatus embodying the invention is readily adapted for installation in such automobiles. Since the necessity for operating the brake and accelerator pedals still exists for automobiles having automatic shift arrangements, the present invention finds utility in such automobiles also. When installing the apparatus in automobiles having no clutch pedal, the apparatus may be modified or simplified as hereinafter described since the usual members arranged to operate the clutch pedal are not required. If the driver of the automobile has full use of his right leg but not his left leg the apparatus may be installed with modifications to eliminate those members arranged to operate the brake and accelerator pedals. In general however the complete apparatus should be installed regardless of the extent of the physical handicap of the particular driver using the automobile, so that the driver can at his option use either hand or foot controls in whole or in part at his option.

It is therefore a principal object of the invention to provide a novel apparatus for operating the foot pedal controls of an automobile.

It is a further object to provide a hand operated apparatus adapted for operating the foot pedal controls of an automobile.

It is a further object to provide an apparatus for installation in a conventional automobile having foot pedals so that the pedals may be operated by hand or foot movements as desired.

It is a further object to provide an apparatus of the character described modified to operate only the clutch pedal or only brake and accelerator pedals of an automobile.

Other and further objects and advantages of the invention will become readily apparent from the following description taken together with the drawing wherein.

Figure 1:
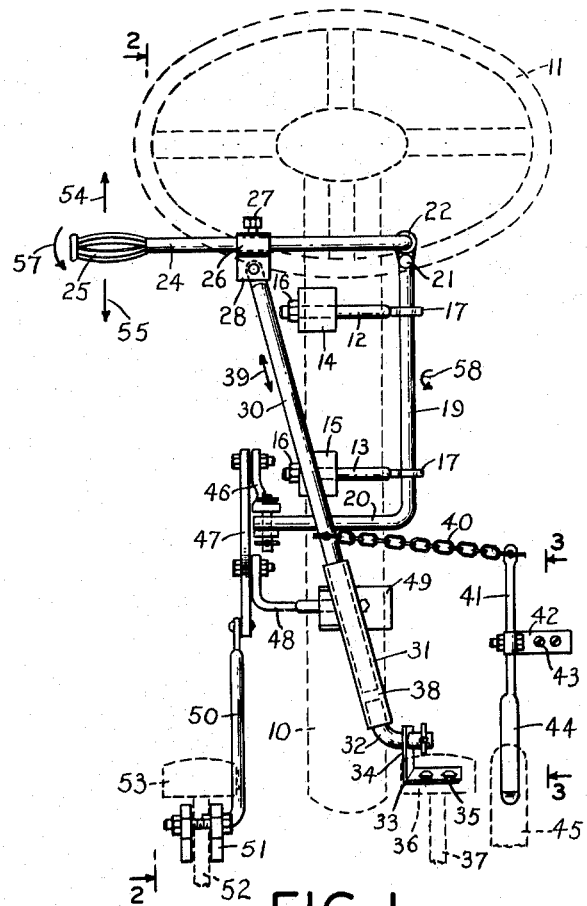
Fig. 1 is an elevational view of an apparatus embodying the invention disposed to operate the pedal controls of an automobile.
Figure 2:
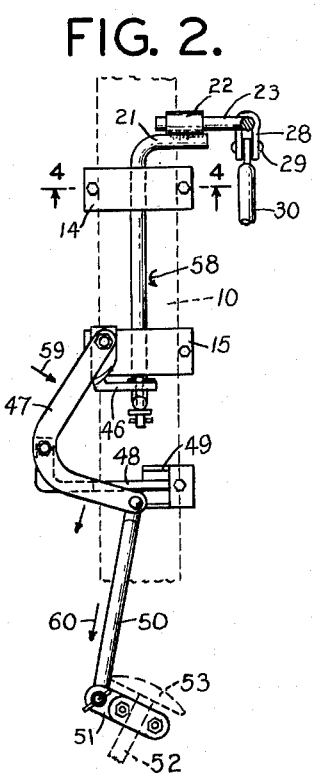
Fig. 2 is a side view taken on lines 2—2 of Fig. 1.
Figure 3:
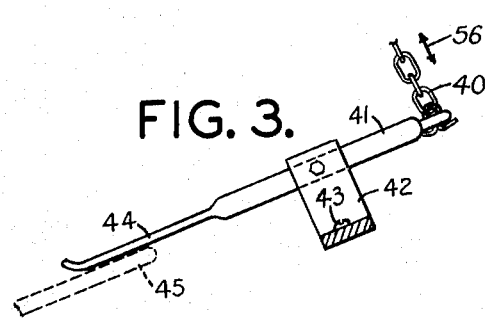
Fig. 3 is a fragmentary side view taken on lines 3—3 of Fig. 1 showing the members which operate the accelerator pedal of an automobile.
Figure 4:
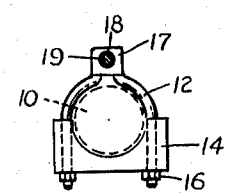
Fig. 4 is a sectional view taken on lines 4—4 of Fig. 3 showing means for attaching the apparatus to the steering wheel post of an automobile.

In Figs. 1 and 2 are shown in dotted lines post 10 carrying steering wheel 11 of a conventional automobile in which is installed apparatus embodying a preferred form of the invention. Attached to post 10 are clamping members comprising the generally U-shaped yokes 12, 13 secured to strap members 14, 15 by suitable nuts 16 mounted on the threaded ends of the yokes. At the opposite ends of the yokes are flattened apertured plate-like portions or lugs 17 as shown clearly in Figs. 1 and 4. Through the apertures 18 of the plate-like portions 17 extend a rotatable cylindrical bar 19. The bar 19 has a lower portion 20 bent substantially perpendicular to the central portion of the bar, and an upper portion 21 bent substantially perpendicular to both the central and lower portions of the bar. Attached to the upper portion 21 is a short sleeve 22 in which is rotatable the end portion 23 of the handle bar 24. End portion 23 is bent substantially perpendicular to handle bar 24 so that bar 24 is normally parallel to the lower portion 20 of bar 19. A suitable hand grip 25 is mounted on the end of handle bar 24. A yoke 26 is disposed on handle bar 24. The threaded bolt 27 serves to clamp the yoke in proper position on the handle bar. The depending side walls 28 of the yoke 26 carry a pintle 29 on which rotates to a limited extent the downwardly extending bar 30. The pintle 29 passes through the upper flattened apertured end of the bar 30. The lower end of bar 30 is inserted in a cylindrical sleeve 31 and is slidable therein. Sleeve 31 is carried by the bent bar 32 rigidly attached thereto. A right angle bracket 33 is carried by bar 32. The upstanding side 34 of the bracket has an aperture which engages bar 32. The other side 35 of the bracket is attached to the brake pedal 36 or preferably to its supporting shaft 37. The lower end of bar 30 is separated from the upper end of bar 32 in sleeve 31 by a space 38 so that bar 30 is capable of a limited movement in sleeve 31 in the direction shown by arrow 39. If desired bar 32 can slide in sleeve 31 while bar 30 is attached to the sleeve. In either arrangement it is necessary to provide the space 38 which allows of lost motion between bars 30 and 32. A non-rigid member such as chain 40 is secured at one end to an intermediate point of bar 30 outside of sleeve 31. The other end of the chain is attached to lever 41. The chain 40 extends downwardly from bar 30 to lever 41 rather more steeply than it appears in Fig. 1. Lever 41 pivots in the support bracket 42 as best shown in Fig. 3. Bracket 42 is attached to the floor (not shown) of the automobile by screws or bolts 43. The end of lever 41 has a flattened portion 44 which bears on the accelerator pedal 45 of the automobile.

The clutch actuating members of the apparatus will now be described. The free end of bar portion 20 engages a crank member 46 which is movably attached to one end of the bell crank lever 47. Lever 47 pivots on support arm 48 carried by clamping member 49. Clamping member 49 is rigidly secured to the post 10. A bar 50 is movably attached at its upper end to the lower end of the crank lever 47. Bar 50 engages the clamp member which is attached to the shaft 52 of clutch pedal 53.

In operation of the apparatus, the driver raises the handle bar 24 as shown by arrow 54 to actuate the accelerator pedal 45. When the handle bar is raised a short distance bar 30 moves in the space 38 in the direction of arrow 39 and draws chain 40 upwardly in the direction shown by arrow 56. The movement of the chain 40 pivots lever 41 which in turn presses the accelerator pedal downwardly. When the handle bar is released the normal spring tension applied to pedal 45 pulls chain 40 downwardly. Thus the driver is provided with a sensitive and readily responsive means to operate the accelerator of the automobile wholly by hand movement.

In the normal movement of bar 30 in the space 38 during operation of the accelerator pedal, the bar 30 will not contact bar 32. To operate the brake pedal the driver lowers handle bar 24 further than is usual in operating the accelerator pedal as shown by arrow 55 until bar 32 is contacted in sleeve 31. At this point chain 40 is slackened to effect complete release of the accelerator pedal while the force on bar 32 moves the brake pedal 36 downwardly to operate the brake system of the automobile. On release of the handle bar, the spring tension actuating the brake pedal in the reverse direction also causes bar 30 and handle bar 24 to move upwardly until the brake pedal is finally released and chain 40 is again stretched to its full operating length, so that the accelerator can be operated by further upward movement of the handle bar 24.

To operate the clutch pedal 53, the handle bar 24 is pulled toward the driver as shown by arrow 57. This causes bar 19 to rotate in the yoke lugs 17 as shown by arrow 58. The bar portion 20 in turn moves crank member 46 which causes movement of the upper end of crank lever 47 in the direction shown by arrow 59. The crank lever 47 is thus caused to pivot on its fulcrum and lower bar 50 as shown by arrow 60 which in turn lowers clutch pedal 53. When the handle bar is moved away from the driver the clutch is released. Of course the usual spring tension actuating the clutch in the reverse direction will assist in this movement of the handle bar.

The arrangement described above permits simultaneous raising of the clutch and application of pressure on the accelerator pedal which movements are necessary in setting the automobile into motion, since it is only necessary for the driver to control the movement of the handle bar away from him as he raises the handle bar 24. The control of all pedals thus requires use of only one hand on the hand grip 25 while the other hand operates the gear shift lever and steering wheel.

It will be noted that movement of all pedals is completely responsive to movement of the handle bar and full advantage is taken of the reverse movements of the pedals under spring tension. Only a little practice is required to enable a driver to control all pedals with facility and complete safety solely by operation of the handle bar. With a little further practice the driver can operate the handle bar by pressure of his forearm on the hand grip or handle bar so that he can continue to keep both hands on the steering wheel while driving the car.

A modification resulting in an economy of parts is possible if the apparatus is to be installed in an automobile in which the clutch pedal is omitted such as in automobiles having automatic shift transmissions. In such installations the bar 19 may be secured rigidly in yokes 12, 13 so that the bar does not rotate. Members 46 through 51 may further be omitted while bar 19 need not be extended and bent to provide lower portion 20. The apparatus will then be adapted to operation of brake and accelerator pedals alone by merely lowering or raising handle bar 24 as necessary.

To modify the apparatus in order to eliminate the accelerator pedal operating members alone the members 40 through 44 may be omitted. To further modify the apparatus to eliminate the brake pedal operating members, the members 30 through 33 may be omitted together with yoke 26.

It must be emphasized that the present invention provides a structure which is adaptable to whatever are the particular requirements of the handicapped driver. Use of the complete apparatus provides the full scope of operations of which the apparatus is capable and is the preferred embodiment of the invention, although in the interest of economy or for other reasons it may be found desirable to install the apparatus in the modified forms indicated as possible.

The invention has been disclosed in its preferred embodiment and a limited number of modifications thereof. Many changes are possible within the range of permissible equivalents without departing from the spirit of the invention or the scope of the appended claim.

I claim:

A hand control for motor vehicles having a brake pedal, an accelerator pedal and a clutch pedal, said hand control comprising a bracket mounted on the steering column of the motor vehicle, a shaft supported by said bracket for angular movement about its longitudinal axis, a handle pivotally connected to said shaft for angular movement about an axis which lies in a plane to which the shaft axis is perpendicular, said handle being movable with said shaft about the longitudinal axis of the shaft and being movable relative to said shaft about said second mentioned axis, a pair of telescopically connected members connected between said handle and the brake pedal, a stop member between said telescopically connected members to prevent relative movement between them when the upper of said telescopically connected members is moved downwardly beyond a predetermined range of movement, whereby downward movement of the handle about the second mentioned axis causes the telescopically connected members to depress the brake pedal and thereby to actuate the brake, a bellcrank operatively connected at one end to the accelerator pedal, a chain operatively connecting the opposite end of said bellcrank to said handle, whereby upward movement of the handle about said second axis causes the bellcrank to depress the accelerator pedal and thereby to actuate the accelerator, and a second bellcrank between the shaft and the clutch pedal, whereby movement of the handle about the first mentioned axis causes the shaft to actuate the second bellcrank and thereby to actuate the clutch pedal and the clutch.

References Cited in the file of this patent

UNITED STATES PATENTS

| | | |
|---|---|---|
| 1,585,855 | Hawn | May 25, 1926 |
| 2,465,183 | Allen | Mar. 22, 1949 |
| 2,539,994 | Engler | Jan. 30, 1951 |
| 2,602,348 | Wilson | July 8, 1952 |
| 2,664,979 | Parent | Jan. 5, 1954 |
| 2,674,902 | Sell | Apr. 13, 1954 |

OTHER REFERENCES

"Safety for the Handicapped," Autocar, pp. A20, 97, Jan. 31, 1947.